United States Patent [19]

Breider et al.

[11] Patent Number: 4,985,692
[45] Date of Patent: Jan. 15, 1991

[54] WORD PROCESSOR WORK STATION WITH A BRAILLE READING LINE

[75] Inventors: Jacob Breider; Arend R. Arends, both of Groningen, Netherlands

[73] Assignee: Vennootschap onder firma: ALVA, Netherlands

[21] Appl. No.: 145,911

[22] Filed: Jan. 20, 1988

[30] Foreign Application Priority Data

Jan. 23, 1987 [NL] Netherlands .................. 8700164

[51] Int. Cl.[5] ........................................... H03M 11/00
[52] U.S. Cl. ............................... 340/407; 340/825.19; 340/709; 434/112; 434/113; 434/115; 341/21
[58] Field of Search ............. 340/407, 825.19, 365 A, 340/710, 709; 434/112–115; 364/709.11, 709.12, 709.13; 341/21, 34

[56] References Cited

U.S. PATENT DOCUMENTS

| | | | |
|---|---|---|---|
| 3,854,131 | 12/1974 | Vanderheiden et al. | 340/710 |
| 4,313,113 | 1/1982 | Thornburg | 340/365 A |
| 4,415,781 | 11/1983 | Frame et al. | 340/365 A |
| 4,445,871 | 5/1984 | Becker | 434/114 |
| 4,488,146 | 12/1984 | Burchart | 340/407 |
| 4,594,683 | 6/1986 | Frank | 364/900 |
| 4,687,444 | 8/1987 | Garner | 340/407 |
| 4,752,772 | 6/1988 | Litt et al. | 340/407 |

FOREIGN PATENT DOCUMENTS 0237090 9/1987 European Pat. Off. .

OTHER PUBLICATIONS

*Microprocessors and Microsystems*, vol. 8, No. 10, Dec. 1984, pp. 528–534, "Realtime Braille Interface for VideoTex Interaction".

*Output*, vol. 15, No. 2, Feb. 1986, pp. 77–78, "Neuartige Folientastatur Mit Druckempfindlichen Kristallelementen".

*Primary Examiner*—Donnie L. Crosland
*Attorney, Agent, or Firm*—Welsh & Katz, Ltd.

[57] ABSTRACT

A working station includes a keyboard for the input of data into a memory, the keyboard including cursor control keys. The working station is provided with a braille reading line and adjacent the braille reading line there are provided additional cursor control means adapted to be operated by a visually handicapped person without the orientation of the hand(s) with respect to the braille reading line being lost.

19 Claims, 1 Drawing Sheet

WORD PROCESSOR WORK STATION WITH A BRAILLE READING LINE

This invention relates to a working station comprising a keyboard for the input of data into a memory, said keyboard including cursor control keys, said working station further having a braille reading line.

A braille reading line is a striplike configuration of sensing means arranged in cells, e.g. pins, adapted for up and down movement and for forming braille characters.

Such braille reading lines are used to provide visually handicapped persons with such data or information as is stored so as to be inaccessible or poorly accessible to them, such as data displayed on a viewing screen.

A working station comprising a braille reading line may be a computer terminal or a word processor having conventionally a keyboard and a viewing screen. It is observed that the presence of a viewing screen is not strictly necessary when the working station is used only by visually handicapped persons. In actual practice, however, a viewing screen is yet normally present on which the data to be inputted or modified by means of the keyboard can be visualized, so that the working station remains also suitable for use by persons not visually handicapped, who do not master braille.

A working station of the above described type is known in practice. As an example can be mentioned the portable braille computer RS 501 of the company of Resus, which comprises a portable computer with viewing screen having a conventional keyboard, and which also has an additional barlike module including a braille reading line, which is placed at some distance in front of, and parallel to, the space bar of the keyboard.

In word processing, it frequently happens that cursor movements are necessary for making changes in the inputted text. The control of the cursor normally takes place by operating the keyboards. The braille cells of the reading line are arranged in such a manner that these indicate the place of the cursor. A person not visually handicapped can immediately see on the viewing screen where the cursor is located and can also immediately visually follow this during displacement.

A visually handicapped person, however, has to move the cursor by means of the keyboard and likewise has to move his or her hands from the keyboard to the braille reading line to check where exactly the cursor is located. This means that during displacement of the cursor, the braille reading line has sometimes to be sensed a great many times entirely or partly, which is comparatively elaborate and at any rate is not conducive to an optimum ease of operation.

It is a object of the present invention to eliminate this drawback and in general to provide an improved working station with braille reading line for visually handicapped persons. To that end, according to the present invention, a working station of the above described type is characterized by additional cursor control means provided adjacent the braille reading line, which means can be operated by a visually handicapped person without the orientation of the hand relative to the braille line being lost.

Some embodiments of the present invention will now be described, by way of example, with reference to the accompanying drawings, in which.

Figure 3:
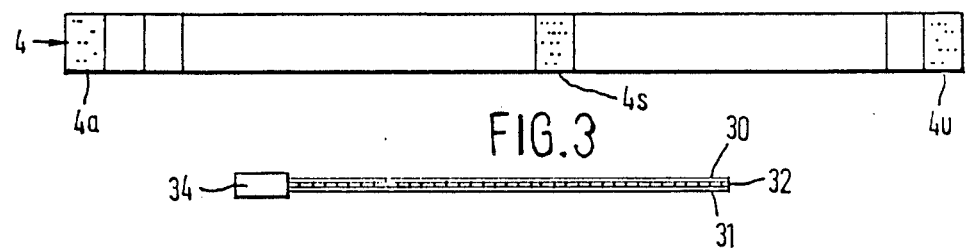
Figure 4:
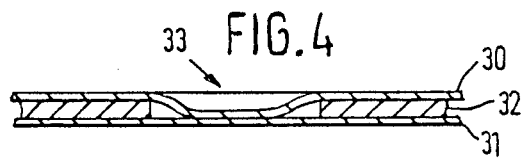

FIGS. 3 and 4 diagrammatically show an embodiment of a switching device for a cursor control device according to the present invention.

Figure 1:
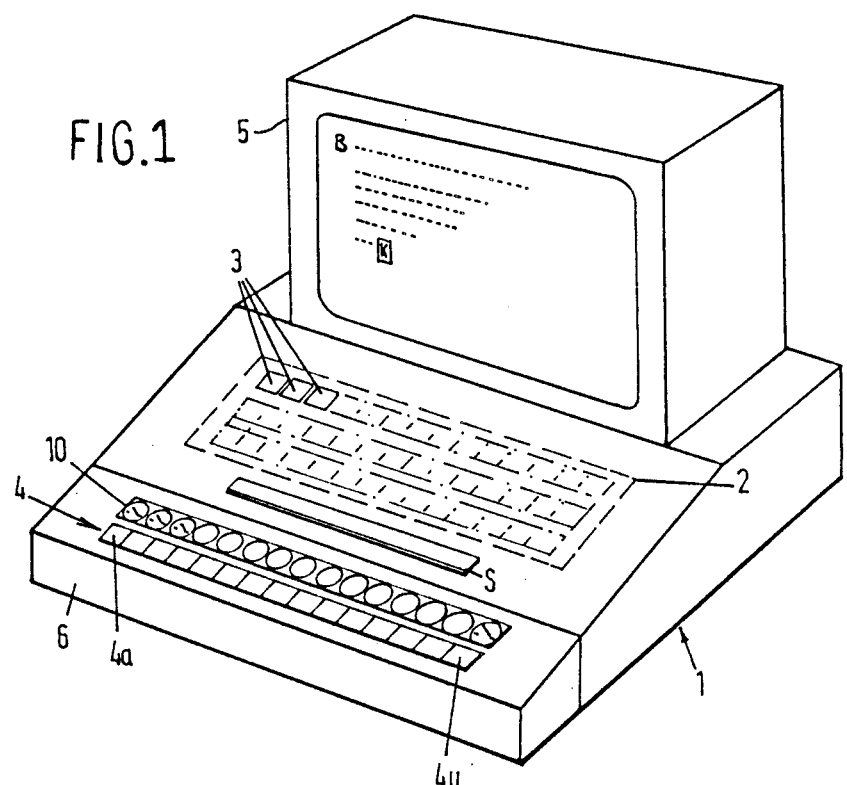
FIG. 1 is a diagrammatic view of a working station having a braille reading line and illustrates the basic principle of the present invention.

FIG. 1 diagrammatically shows a working station for visually handicapped persons. The working station comprises a keyboard 2 forming part e.g. of a personal computer or a computer terminal or a word processor. Text or other data can be inputted into a memory or data already inputted can be changed by means of the keyboard. The keyboard comprises the conventionally required keys, only some of which are shown diagrammatically at 3.

Data input can be visualized on the viewing screen 4 of a monitor 5.

The keyboard comprises besides the conventional character keys, one or more likewise conventional cursor control keys, which are adapted to bring the cursor or travelling indicator K, normally present on the viewing screen at the location where the input of data is to be continued and automatically follows the input of data (or its erasure), to another place on the viewing screen.

To enable data input to be read even by visually handicapped persons, there is provided a braille reading line 4 which, in this embodiment, is disposed at some distance in front of the conventional space bar 5 of the keyboard.

The braille reading line can be incorporated directly in the console of the working station but may also be a separately connectable barlike module 6, as shown in FIG. 1. The braille reading line comprises a plurality of juxtaposed braille cells 4a. . . 4n, each consisting of a group of pins or the like adapted for separate up and down movement, by means of which braille characters can be formed.

Preferably, the number of braille cells corresponds with the number of characters that can be shown on a line of the viewing screen.

The braille reading line can be matched to a given line of the viewing screen by means of suitable keys and is coupled to the word processor or computer in such a manner that the pins of the braille cells are brought into a position corresponding with the data displayed on the screen in the line chosen.

It is thus possible for a visually handicapped person to read the data on the screen by means of the braille reading line.

The braille reading line is furthermore arranged in such a manner that this indicates the instantaneous cursor location by means of a fixed position in each braille cell. This means that all braille cells in the same position have a pin moving upwardly when the cursor position corresponds with the place of the respective braille cell on the information line displayed at that moment by the braille reading line. A different representation of the cursor position by the braille cells is also possible, e.g. by moving all pins of a cell up and down simultaneously.

Necessarily, some space is provided between the braille reading line and the keyboard. This means that, when during the sensing of the viewing screen by means of the braille reading line, the cursor is to be moved to a certain location, one hand or both hands have to be displaced from the reading line to the keyboard so as to operate the cursor control keys. In doing this, the contact with the reading line is lost, so that, for checking the instantaneous position of the cursor, the hands should again be moved to the braille reading line, which will then have to be read at least partly until the cursor position has been detected. This process should in general be repeated a few times until the cursor has reached the exact desired position.

According to the present invention, cursor control means are provided that are positioned and arranged in such a manner that, for operating the cursor control means, the contact with the braille reading line need not be broken o hardly so.

FIG. 1 illustrates the principle of the present invention. Along the braille reading line 4, there extends a switching device 10, which is as long as the braille reading line and can be operated by means of any section adjoining a braille cell of the braille reading line to displace the cursor.

Switching device 10 may be intermediate braille reading line 4 and space bar 5, as shown, but may also be arranged in front of the braille reading line.

FIG. 2 once again shows the braille reading line 4 of FIG. 1 and the switching device 10 extending beside the braille reading line. The switching device is shown diagrammatically in FIGS. 1 and 2 as being composed of a plurality of switches 10a...10n, each switch opposing a corresponding braille cell 4a...4n of the braille reading line.

The switching device, consequently, can be operated from any place of the braille reading line in a simple manner by means of a slight finger displacement, to be performed from each braille cell always over the same distance and in the same direction. Consequently, after operation of the switching device, the finger can again be brought back into the starting position on the braille reading line in a simple manner and in actual practice, the orientation of the user towards the braille reading line is not lost.

The switching device can be coupled to the cursor control means of the working station in such a manner that, during the operation of any switch, the cursor first jumps to the beginning of the line displayed at that moment by the braille reading line and subsequently moves stepwise along the characters of the line as long as a switch of the switching device is held. As soon as the user feels through the braille reading line that the cursor has reached the desired position, the switch is released or reset when the switches have two discrete positions.

In such an embodiment, all switches, in actual fact, have the same function. Consequently, in that case, all switches can be fully coupled to each other and even be replaced by a single, combined switch. Such a combined switch may e.g. be an elongate push button switch, which has a form similar to that of the space bar of the keyboard, and which is placed in such a manner that the switch can be operated e.g. with the thumb of a hand placed on the braille reading line. In that case, the switching device need not necessarily be positioned directly adjacent the braille reading line and may even be divided into a plurality of discrete, spread switches in such a manner that, in any position of the hand on the braille reading line, one of the switches can be operated by the thumb o another free finger of the same hand. Operation by the other hand is possible as well.

It is observed that the working station can be arranged in such a manner that separate means are provided for moving the cursor to the beginning of the information line displayed by the braille reading line. In that case, that function need no longer be performed by the switching device 10.

Preferably, the switching device is arranged in such a manner that each switch corresponds uniquely with either of the braille cells, as is the case in the configuration shown. The switching device is then coupled to the cursor control of the working station already present in such a manner that, upon operation of a given switch, or of a given section of the switching device, the cursor is displaced directly towards that position on the viewing screen which corresponds with the braille cell associated with the operated switch or section.

In this manner, the cursor can be displaced more quickly and effectively without the necessity of holding or resetting a switch. In the configuration shown in FIG. 2, this means that, upon operation of the switch or section $10a$, the cursor moves directly towards the position corresponding with the braille cell $4a$. Upon operation of switch or section $10_s$, the cursor moves towards the position corresponding with the cell $4s$, etc.

Figure 2:
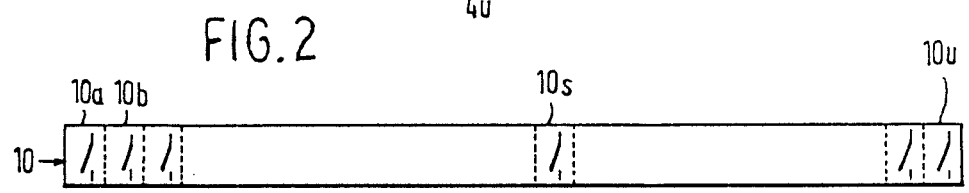
FIG. 2 is a diagrammatic top view of a braille reading line with an embodiment of an associated cursor control device according to the present invention.

In such an embodiment, a short distance between a braille cell and an associated switch or section of the switching device is very important for an effective and easy operation and a configuration of the type as shown in FIG. 2 is preferred.

FIGS. 1 and 2 diagrammatically show the switching device 10 as a series of discrete switches. In actual fact, it is possible to use discrete (miniature) switches. Besides, both switches with two discrete positions and switches with a single rest position can be used. The switches may further be of any conventional type such as tumbler switches, push button switches, capacitive switches, contact switches, etc.

Preferably, the switching device is flat and striplike, so that the switching device can be mounted in a comparatively simple manner on an existing braille reading line module or on an existing working station with incorporated braille reading line.

One embodiment of a suitable configuration of a switching device is shown diagrammatically in cross section in FIG. 3. FIG. 3 shows a laminated assembly of a first conductive foil 30 and a second conductive foil 31. Between foils 30 and 31 there is provided a non-conductive, apertured foil 32. When a finger presses foil 30, this will be pressed with some force against the apertured foil 32, thereby establishing an electrical contact with the foil 31 through one or more apertures in foil 32, as shown in FIG. 4 by the arrow 33. It is observed that, in an embodiment reduced to practice, foils 30,32 and 31 have no interspace, as in FIG. 3, but are in contact with each other, as in FIG. 4. The foils are electrically connected to a signal processor, not shown, by means of a connector 34 shown diagrammatically. Furthermore, foils 30,31 are covered at the top and at the bottom, respectively, by an electrically insulating foil. Alternatively, foils 30,31 can be conductive on one side only, e.g. by means of a thin coat of conductive material applied thereto.

When at least one of the foils 30,31 has a predetermined resistance per unit length, the current through the switching device at any moment is proportional to the location of pressing the switching device and the associated braille cell can be identified in a simple manner.

It is also possible to apply to one of the foils a plurality of conductive tracks, e.g. seven, which form a plurality of contacts at the level of each braille cell. The contacts can be brought into electrical contact with the other foil again by pressing the upper foil. The specific combination of contact then uniquely identifies the associated braille cell, so that the required cursor control signals can be formed by the signal processor in a simple manner.

It is observed that after reading the above, various modifications, in particular of the switching device, will readily occur to one skilled in the art. For instance, the braille cells themselves may be designed as switching devices, by arranging that when one or more raised pins are pressed down, an electrical signal is produced such modifications are deemed to fall within the scope of the present invention.

We claim:

1. A working station comprising a keyboard for the input of data into a memory, and a braille reading line; said keyboard including a conventional first cursor control means, for controlling a writing cursor, said writing cursor indicating the point in the text where input or editing or data can occur; said braille reading line including a plurality of braille cells, a control means for controlling the line of text displayed by said reading line; and a second cursor control means, for controlling said writing cursor, said second cursor control means being in or adjacent to said reading line; said second cursor control means being capable of being operated by a visually handicapped person without the orientation of the hand relative to the braille reading line being lost.

2. A working station as claimed in claim 1 characterized in that said second cursor control means comprise a switching device including one or more switches, said device being disposed adjacent the braille reading line.

3. A working station as claimed in claim 2 characterized in that said second cursor control means is arranged, upon operation of the switching device, to cause the writing cursor to scan at least the data line displayed by the braille reading line, stepwise from its beginning until the operation of the switching device is terminated.

4. A working station as claimed in claim 2, characterized in that the switching device consists of a single switch with an elongate, horizontal operating means.

5. A working station as claimed in claim '3, characterized in that the switching device consists of a single switch with an elongate, horizontal operating means.

6. A working station as claimed in claim. 2, characterized in that the switching device comprises a plurality of spaced apart switches actuable from the braille reading line.

7. A working station as claimed in claim 3, characterized in that the switching device comprises a plurality of spaced apart switches actuable from the braille reading line.

8. A working station as claimed in claim 2, characterized in that the switching device is an elongate strip of laminated material comprising two foil strips separated by an intermediate apertured foil strip, and which, at least at the facing sides, are electrically conductive and are adapted to be contacted with one another by exerting pressure via the apertures in the intermediate foil strip.

9. A working station as claimed in claim 3, characterized in that the switching device is an elongate strip of laminated material comprising two foil strips separated by an intermediate apertured foil strip, and which, at least at the facing sides, are electrically conductive and are adapted to be contacted with one another by exerting pressure via the apertures in the intermediate foil strip.

10. A working station as claimed in claim 2, characterized in that the switching device is an elongate device provided parallel to, and adjacent, the braille reading line, and which, corresponding with each braille cell of the braille reading line, comprises a separately actuable switching section.

11. A working station as claimed in claim 3, characterized in that the switching device is an elongate device provided parallel to, and adjacent, the braille reading line, and which, corresponding with each braille cell of the braille reading line, comprises a separately actuable switching section.

12. A working station as claimed in claim 1, characterized in that the said second cursor control means comprise a switching device including one or more switches and provided adjacent the braille reading line, and that the switching device is an elongate device provided parallel to, and adjacent, the braille reading line, and which, corresponding with each braille cell of the braille reading line, comprises a separately actuable switching section and that the cursor control means are adapted, upon operation of a switching section of the switching device associated with a certain braille cell, to move the cursor directly to the data position corresponding with such braille cell.

13. A working station as claimed in claim 8, characterized in that the switching device is an elongate strip of laminated material comprising two foil strips separated by an intermediate apertured foil strip, and which, at least at the facing sides, are electrically conductive and are adapted to be contacted with one another, by exerting pressure via the apertures in the intermediate foil strip, and that at least one of the two foil strips mentioned has a predetermined electric resistance per unit of length.

14. A working station as claimed in claim 8, characterized in that the switching device comprises a first foil strip lying on an apertured intermediate foil strip and a second foil strip, said first and second foil strip being adapted to be contacted with one another by exerting pressure via the apertures in the intermediate foil strip, and that at least one of the first or the second foil strips comprises a plurality of conductive tracks which, for forming the switching sections at a location corresponding with a braille cell, terminates in a predetermined combination of contacts, said contacts being adapted to be contacted with a conductive portion of the other foil strip.

15. A working station as claimed in claim 9, characterized in that conductive portions of the foil strips are connected to a signal processor, which converts the signals received from the switching device into signals suitable for cursor control.

16. A working station as claimed in claim 10, characterized in that conductive portions of the foil strips are connected to a signal processor, which converts the signals received from the switching device into signals suitable for cursor control.

17. A working station as claimed in claim 1, characterized in that the second cursor control means comprise one or more sensing means of each braille cell of the braille reading line, said sensing means being adapted to be pressed so as to produce an electrical signal.

18. A working station as claimed in claim 1 wherein said plurality of braille cells contained in said reading line equals the number of characters displayed in a line of text.

19. A switching device for cursor control for use in a system that includes an elongated braille reading line with separate braille reading cells, characterized in that the device has an elongate shape corresponding with the elongate shape of the braille reading line and that during operation, the switching device is adjacent each braille reading cell and actuable without displacing the hand from the braille reading line.

* * * * *